(12) United States Patent
Ashida et al.

(10) Patent No.: US 7,780,172 B2
(45) Date of Patent: Aug. 24, 2010

(54) ROTATION SHAFT SEAL

(75) Inventors: Tetsuya Ashida, Hyogo (JP); Hironori Oida, Wakayama (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 227 days.

(21) Appl. No.: 11/797,264

(22) Filed: May 2, 2007

(65) Prior Publication Data

US 2008/0169613 A1 Jul. 17, 2008

(30) Foreign Application Priority Data

Jan. 15, 2007 (JP) ............................. 2007-005337

(51) Int. Cl.
*F16J 15/32* (2006.01)
(52) U.S. Cl. ...................... 277/560; 277/564
(58) Field of Classification Search ................. 277/560, 277/559, 564
See application file for complete search history.

(56) References Cited

U.S. PATENT DOCUMENTS

| 4,167,981 | A | * | 9/1979 | Bertin | 277/560 |
| 4,623,153 | A | * | 11/1986 | Nagasawa | 277/551 |
| 4,964,647 | A | * | 10/1990 | Stephan | 277/560 |
| 5,183,271 | A | * | 2/1993 | Wada et al. | 277/351 |
| 5,860,656 | A | * | 1/1999 | Obata et al. | 277/559 |
| 6,123,514 | A | * | 9/2000 | Kawaguchi et al. | 417/222.2 |
| 6,290,470 | B1 | * | 9/2001 | Okuno et al. | 417/269 |
| 6,511,075 | B1 | * | 1/2003 | Schmidt | 277/436 |
| 6,517,082 | B2 | * | 2/2003 | Yamada et al. | 277/559 |
| 6,520,506 | B2 | * | 2/2003 | Reinhardt et al. | 277/549 |
| 6,715,769 | B2 | * | 4/2004 | Hosokawa et al. | 277/572 |
| 7,467,797 | B2 | * | 12/2008 | Oiyama et al. | 277/553 |
| 2007/0054586 | A1 | * | 3/2007 | Baba | 446/27 |

FOREIGN PATENT DOCUMENTS

JP 3346743 9/2002

* cited by examiner

*Primary Examiner*—Alison K Pickard
(74) *Attorney, Agent, or Firm*—Kratz, Quintos & Hanson, LLP

(57) ABSTRACT

In a rotation shaft seal provided with a rubber lip portion, disposed between a housing and a rotation shaft and sliding on the rotation shaft, and a supporting member receiving the lip portion from a low-pressure side, the cross-sectional configuration of the lip portion in free state is a trapezoid diminishing to the end having the maximum thickness portion within an area received by the supporting member.

4 Claims, 6 Drawing Sheets

ROTATION SHAFT SEAL

BACKGROUND OF THE INVENTION

1. Field of the Invention

This invention relates to a rotation shaft seal, especially, a rotation shaft seal used to seal high-pressure fluid such as $CO_2$ gas.

2. Description of the Related Art

As a conventional rotation shaft seal, one having a construction shown in FIG. 6 is known. That is to say, a rotation shaft seal, in which a seal elements 33 and 34 made of PTFE and a rubber lip 35 are assembled with an outer case 36, a supporting member 37, and an inner case 38, is widely known (refer to Japanese Patent No. 3346743, for example).

However, in the conventional rotation shaft seal shown in FIG. 6, with recent progress of high-pressurization with cooling media such as $CO_2$, contact pressure P of the rubber lip 35 on a rotation shaft 2 becomes excessive as shown in FIG. 4B, abrasion is developed early, and outer leak of sealed fluid is generated. That is to say, the conventional rubber lip 35 having a thickness dimension $W_4$ approximately same to a tip end 35a is pressed to the rotation shaft 2 with a contact pressure distribution of steep mountain shape. This causes problem in durability.

It is therefore an object of the present invention to provide a rotation shaft seal with which the contact pressure is reduced keeping number of construction parts, abrasion is hardly generated with lubricant oil lead to sliding face, and excellent sealability is kept for a long period of time.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 6:
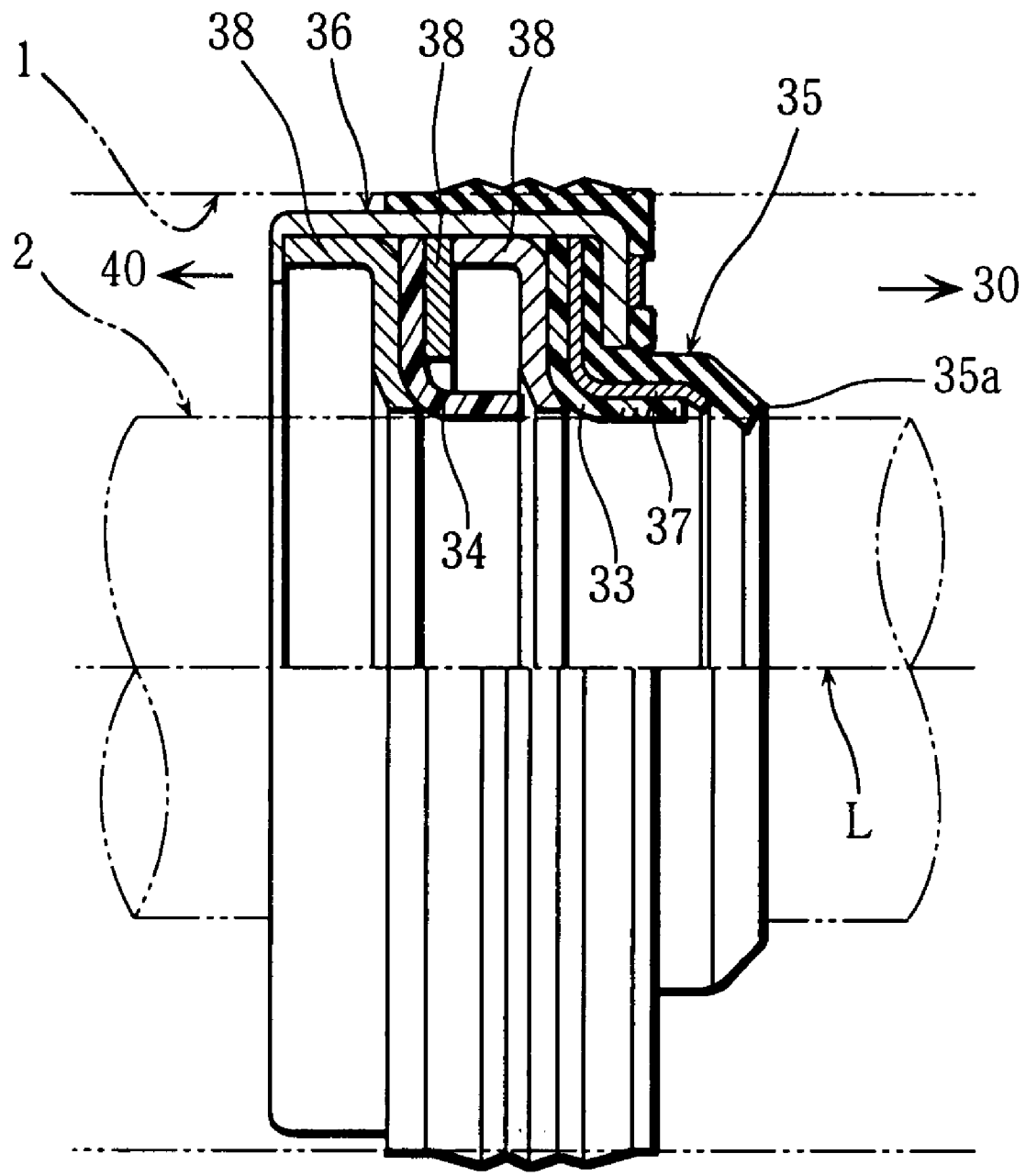
FIG. 6 is a half cross-sectional view of a conventional example.

FIGS. 1 through 3 and FIG. 4A show an embodiment of a rotation shaft seal relating to the present invention. The rotation shaft seal is composed of a rubber lip portion 3 disposed between a housing and a rotation shaft 2 and sliding on the rotation shaft 2, a supporting member 4 receiving the lip portion 3 from a back face 3a on a low-pressure side, an outer case 5 of metal to unitedly hold the rubber lip portion 3 with heat molding, adhesion, or welding, (one or plural) seal element(s) of PTFE making pumping effect (although not shown in FIGS. 1 and 2, it is obvious referring to FIG. 6 of the conventional example), and an inner case of metal disposed between an inner brim portion 5a on high-pressure side of the outer case 5 and an inner brim portion on low-pressure side not shown in Figures for holding the supporting member 4 and the seal element. A peripheral face of a cylinder portion of the outer case 5 is covered with rubber material continued from the rubber lip portion 3 and fit to an inner peripheral face of the housing 1 with elastic deformation to keep tight-fit state.

While the lip portion 3 and the supporting member 4 have the most remarkable characteristics of the present invention, other parts can be conventional various known constructions (refer to FIG. 6) and not shown in FIGS. 1 through 4A.

In FIGS. 1 through 4A, the right side is a high-pressure side 30 and the left side is a low-pressure side 40 such as atmosphere. Cooling medium such as $CO_2$ and fluid such as lubricant oil are stored on the high-pressure side 30.

Figure 1:
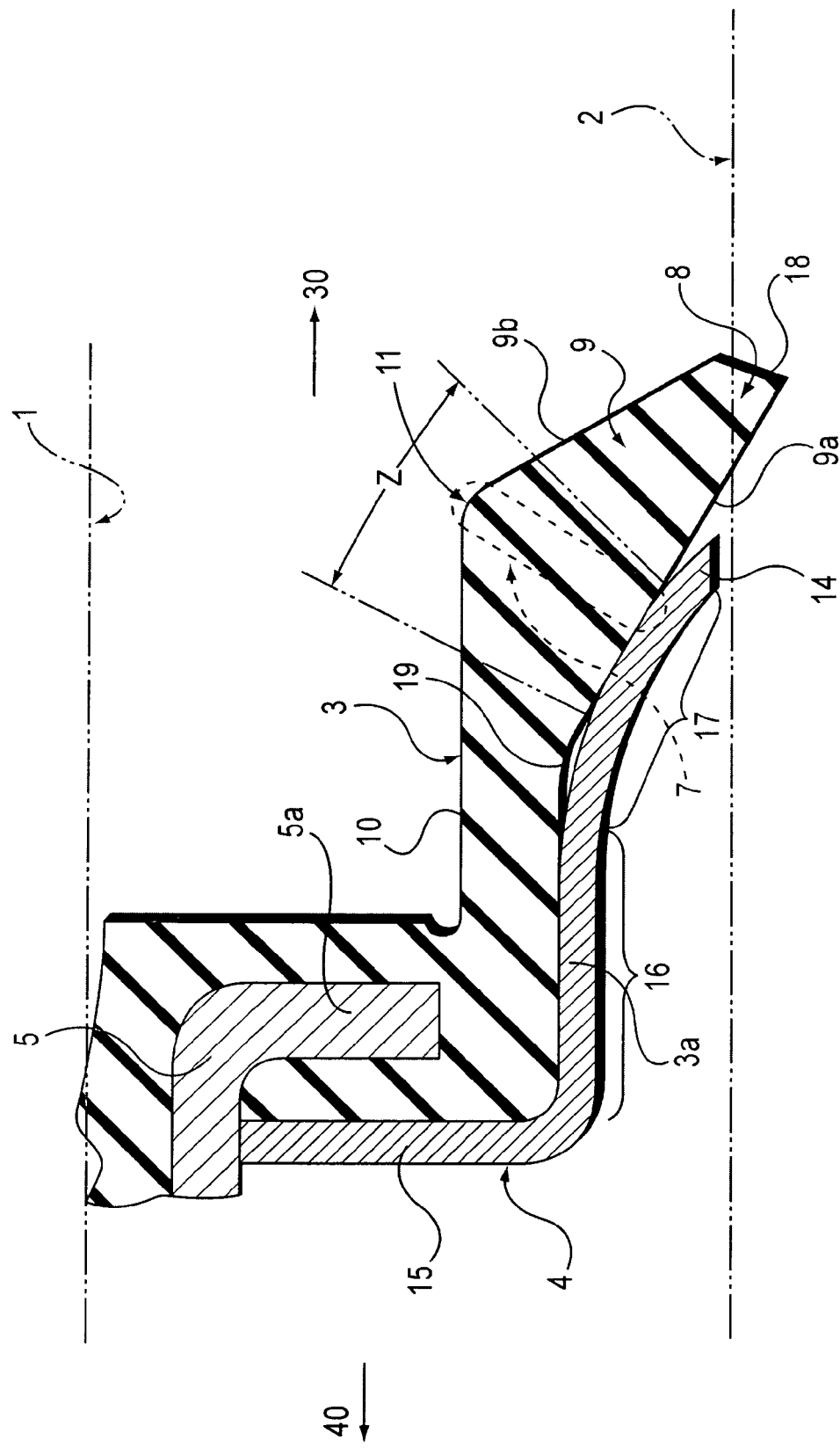
FIG. 1 is a cross-sectional view of a principal portion showing an embodiment of the present invention.
Figure 2:
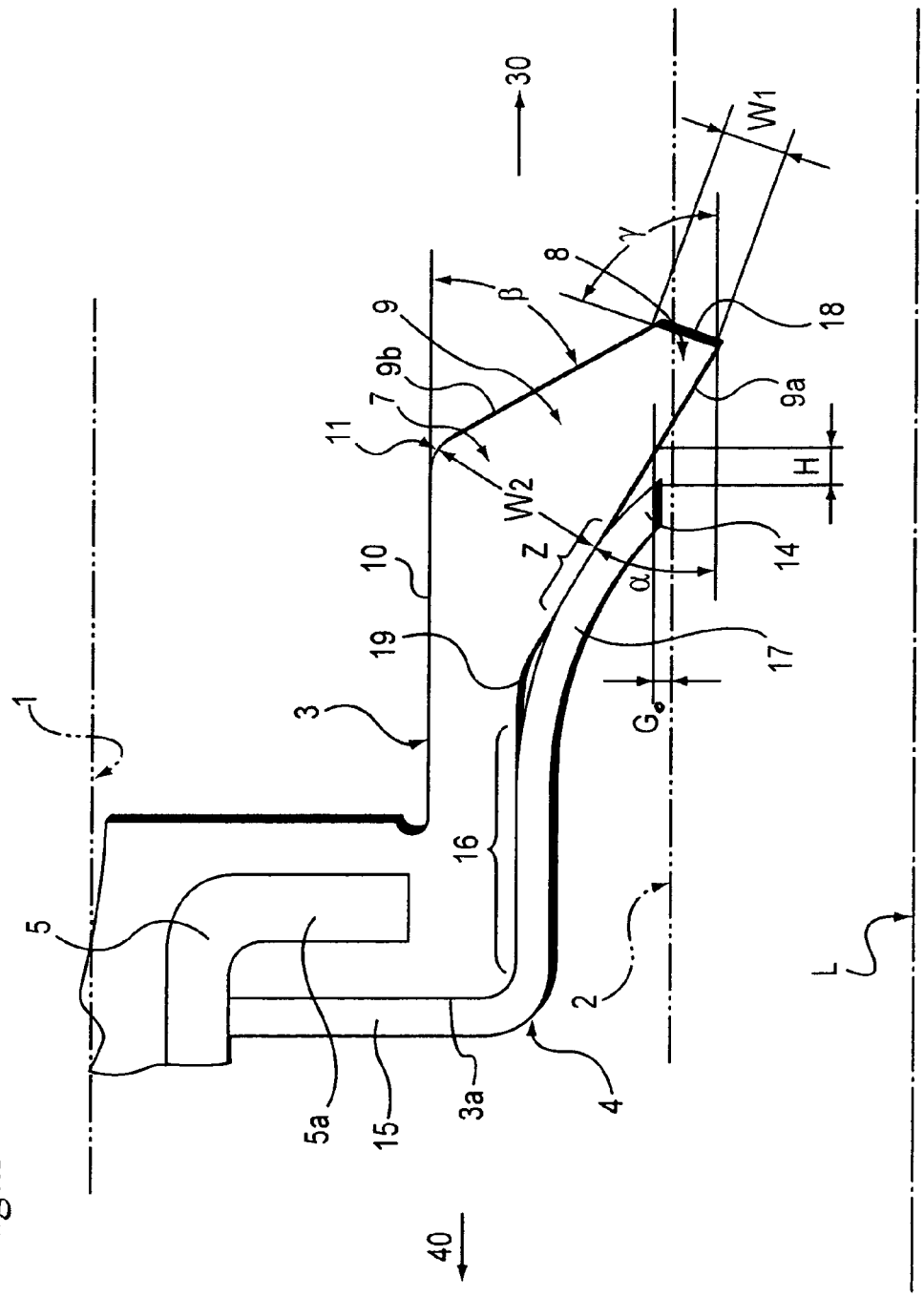
FIG. 2 is an explanatory cross-sectional view of a principal portion to explain dimensions and configurations.
Figure 3:
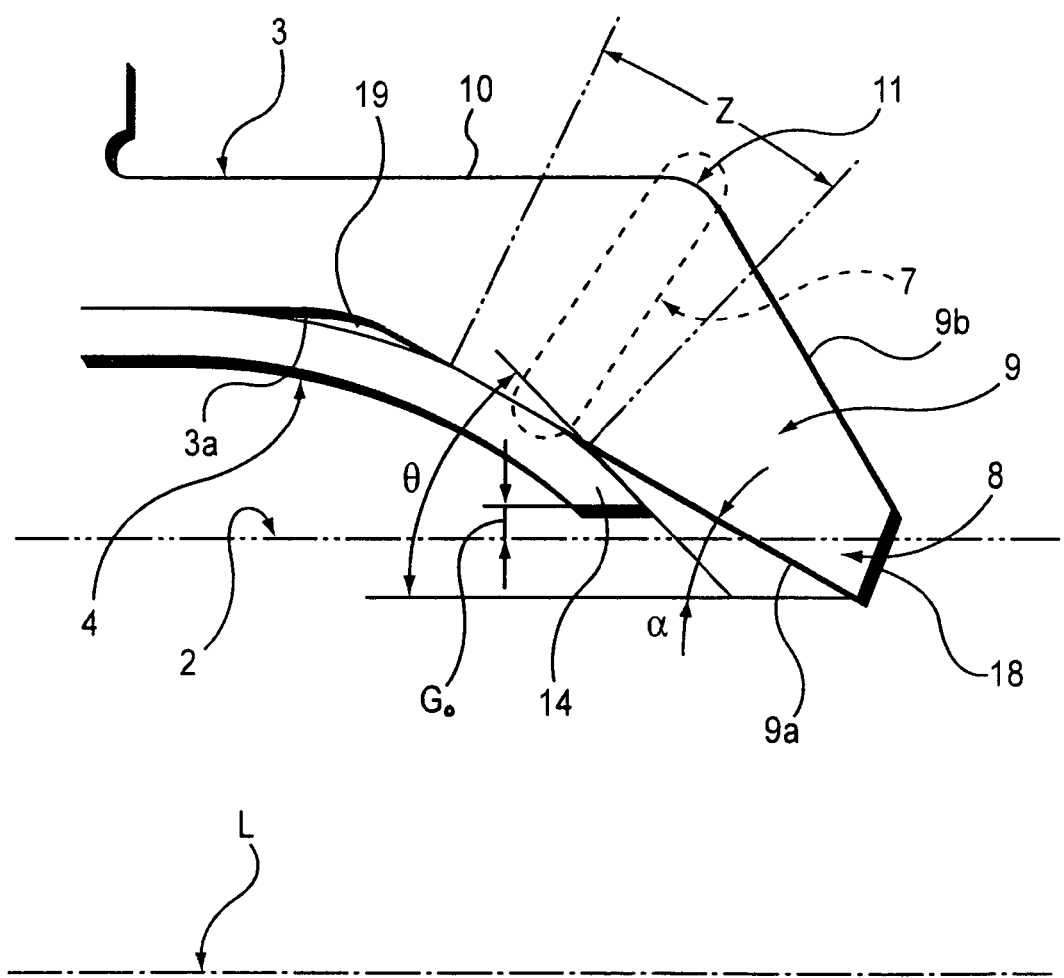
FIG. 3 is an explanatory cross-sectional view of a principal portion to explain dimensions and configurations.

In FIGS. 1 through 3, free state is shown with solid lines. That is to say, the lines show a free state before the rotation shaft is disposed between the housing 1 and the rotation shaft 2. The lip portion 3 has the maximum thickness portion 7 of the maximum thickness dimension $W_2$ in an area Z where the lip portion 3 is received by the supporting member. The maximum thickness portion 7 is shown with broken lines in FIGS. 1, 3, and 4.

And, the lip portion 3 is provided with a lip end portion 9 having diminishing (approximately trapezoidal) configuration gradually becoming thinner (reducing the thickness) from the maximum thickness portion 7 to a tip end 8 of the lip under the free state.

And, when a back face inclination angle of a back face 9a on the low-pressure side of the lip end portion 9 to an axis L of the rotation shaft is α, and an inclination angle on pressure-receiving side of an inclining face 9b on the high-pressure side of the lip end portion 9 is β, the angles α and β are set to fulfill the following relational expressions. That is to say, $15° \leq \alpha \leq 30°$ and $1.7 \leq \beta/\alpha \leq 3.5$.

Especially, $20° \leq \alpha \leq 30°$ and $2.0 \leq \beta/\alpha \leq 2.5$ are preferable.

And, the tip end 8 of the lip is composed of a ring end face 18 of enlarging slope toward the high-pressure side 30. That is to say, the end face 18 is observed as a ring in a direction parallel to the axis L, and width dimension $W_1$ is set to be 0.5 mm to 1.5 mm (in case that the outer diameter of the rotation shaft 2 is about 5 mm to 15 mm).

Further, when an end face inclination angle of the ring end face 18 forming the tip end 8 to the axis L of the rotation shaft 2 is γ, an relational expression $60° \leq \gamma \leq 90°$ is fulfilled.

As shown in FIG. 1 through FIG. 3, the maximum thickness portion 7 of the lip portion 3 exists on (corresponds to) a position of a corner portion 11 where the inclining face 9b, of which cross section in free state is straight, and a straight portion 10, having a cylindrical external configuration parallel to the axis L, are crossing. Further, an R-shaped chamfer of small radius of curvature may be added to the corner portion 11, and the position of the corner portion 11 in the axis direction is on the high-pressure side 30 to a tip end 14 on the high-pressure side of the supporting member 4.

The supporting member 4, having an approximately L-shaped cross section, is composed of an orthogonal wall portion 15 at right angles with the axis L, a cylindrical wall portion 16 formed by bending an inner end of the orthogonal wall portion 15 to the high-pressure side 30 for about 90°, and a receiving wall portion 17 (of arc-shaped cross section) formed by extending an end portion of the cylindrical wall portion 16 as to gently diminish in diameter toward the high-pressure side. The receiving wall portion 17 is having an arc-shaped cross section gently curving as to be convex to an outer diameter direction, and parted from (under the free state) the back face 9a of the lip end portion 9 at the tip end 14 with a gap dimension H equal to or more than 0.1 mm when measured in a direction parallel to the axis L. The gap dimension H is preferably 0.1 mm to 0.5 mm.

And, in Figures, a gap portion 19 (of crescent shape) is formed between the back face 3a and the back face 9a near a border of the cylindrical wall portion 16 and the receiving wall portion 17. Contact pressure P shown in FIG. 4A described later can be slightly reduced by the gap portion 19. The gap portion 19 may be omitted (not generated) when desired.

The straight portion 10 is formed by extending a cylindrical wall on the base portion of the lip portion 3 covering the cylindrical wall portion 16 of the supporting member 4 with keeping the outer diameter dimension of the cylindrical wall, and the straight portion 10 reaches the corner portion 11 with approximately same outer diameter dimension. That is to say, although not shown in Figures, the straight portion 10 of cylindrical external configuration parallel to the axis L includes a case that the straight portion 10 slightly inclines against the axis L with a small angle within ±5°. Therefore, the outer diameter dimension of the straight portion 10 is defined as to include a case that the outer diameter dimension gently increases (or decreases) toward the high-pressure side 30.

Then, in Figures, the tip end 14 of the supporting member 4 is formed by cutting or press work into an inner peripheral configuration parallel to the peripheral face of the rotation shaft 2, and a gap dimension Go between the inner peripheral face 14a and the peripheral face of the rotation shaft 2 when the seal is attached is set to be 0.1 mm$\leq$Go$\leq$0.15 mm. Further, the following relational expression is fulfilled by the gap dimension Go and the width dimension $W_1$ of the former-described ring end face 18. That is to say, $3 \leq W_1/Go \leq 15$.

And, the maximum thickness dimension $W_2$ of the maximum thickness portion 7 is set sufficiently large as to be 2.0 to 4.0 times larger than a width dimension of the tip end 8 (ring end face 18). Preferably, 2.5 to 3.5 times larger than the width dimension of the tip end 8. To express that by relational expressions, $2.0 \leq W_2/W_1 \leq 4.0$, and preferably $2.5 \leq W_2/W_1 \leq 3.5$.

As clearly shown in Figures, it is one of the characteristics of the present invention that the straight inclining face 9b is formed from the outer end of the tip end 8 (ring end face 18) to the corner portion 11 without bent.

And, an inclination angle θ, formed by the axis L and a tangent line touching the outer face of the tip end 14 on the high-pressure side of the supporting member 4, is set to be less than 90°, and preferably $20° \leq \theta \leq 60°$.

The supporting member 4 is made of metal or synthetic resin. And, an inclination angle β of the inclining face 9b on the high-pressure side of the lip end portion 9 is set within a range of 50° to 80°.

Figures 4A, 4B:
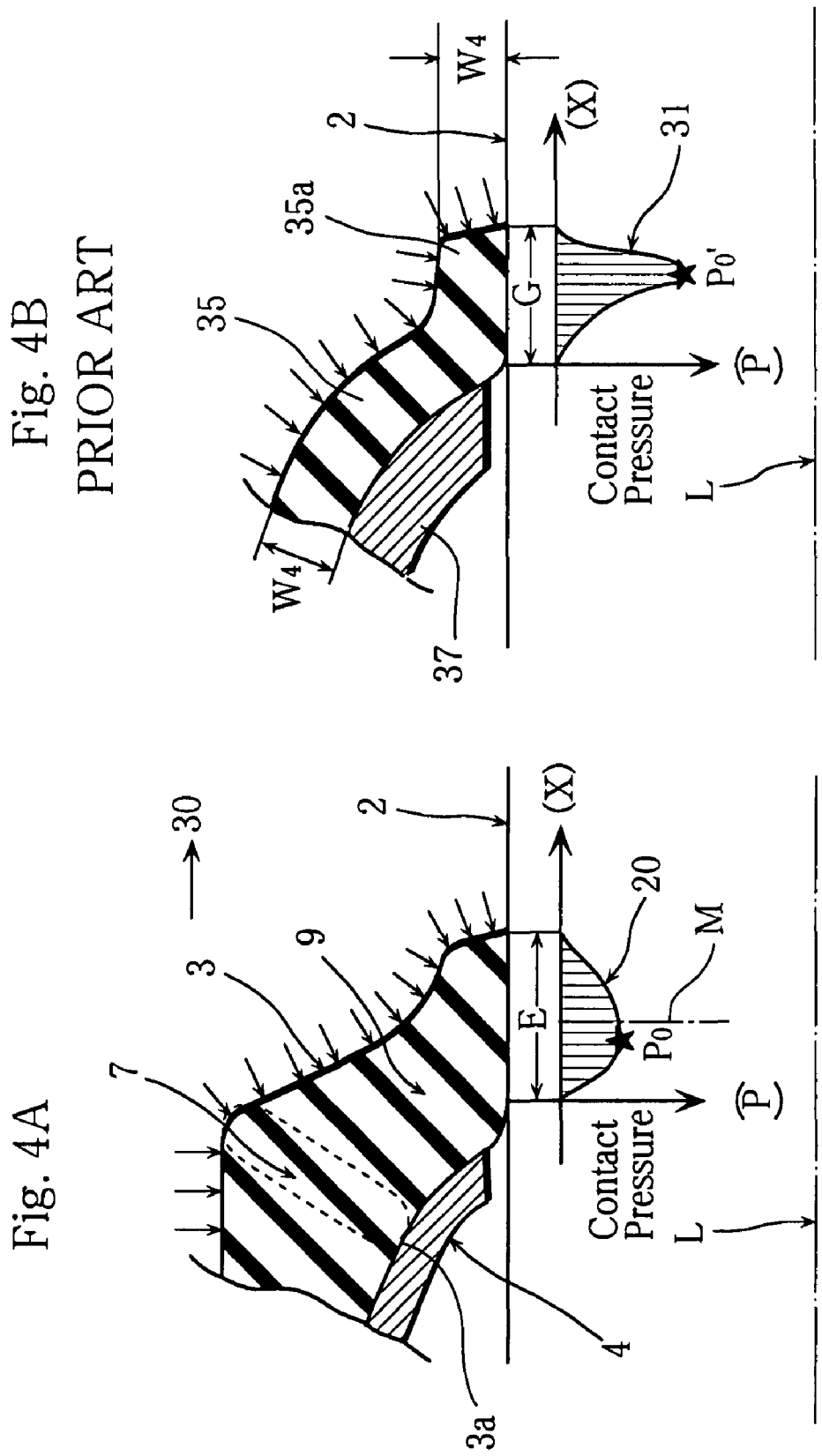
FIG. 4A is an explanatory view of a principal portion to explain product of the present invention.
FIG. 4B is an explanatory view of a principal portion to explain conventional product.
Figure 5:
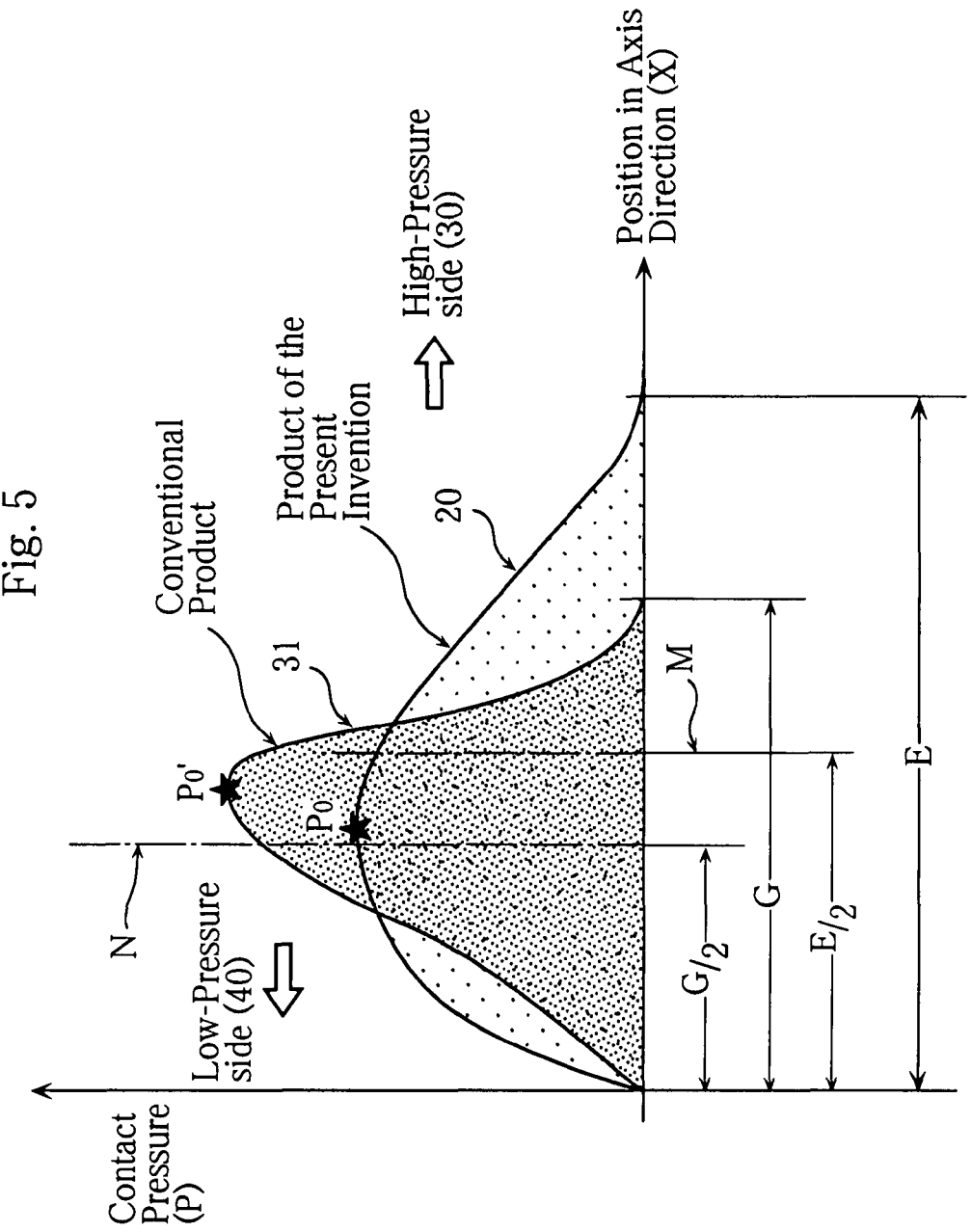
FIG. 5 is a graph of contact pressure.

Next, FIG. 4A and FIG. 4B show results of FEM analysis to compare a product of the present invention and a conventional product when pressure is added (attached pressure-receiving state). FIG. 5 shows distribution of contact pressure of FIG. 4A and FIG. 4B in detail (graphs of FIG. 4A and FIG. 4B and graphs of FIG. 5 are drawn as to be inverted).

In the product of the present invention, the lip end portion 9 contacts the rotation shaft 2, the back face inclination angle α in FIG. 2 is 0 (0°), a distribution curve 20 of the contact pressure P is hill-shaped (gentle mountain-shaped), and the position of a peak (summit portion) $P_0$ shown with an asterisk is on the low-pressure side 40 to a center M in axis direction of a contact area E.

On the contrary, in the conventional product, as shown in FIG. 4B and FIG. 5, thickness dimension $W_4$ is approximately uniform, a distribution curve 31 of the contact pressure P is steep mountain-shaped, and the position of a peak (summit portion) $P_0'$ shown with an asterisk is on the high-pressure side 30 to the center M in axis direction of the contact area E.

Further, according to FEM analysis in the product of the present invention and the conventional product, the product of the present invention can reduce the maximum contact pressure (pressure of the peaks $P_0$ and $P_0'$) for 25% in comparison with the conventional product. Therefore, the product of the present invention can prevent local abrasion. And, while the contact pressure distribution curve 31 of the conventional product is (steep) mountain-shaped, the contact pressure distribution curve 20 of the product of the present invention shows a hill shape (gentle mountain shape), lubricant oil is easily lead to a portion between the lip end portion 9 and the rotation shaft 2, and abrasion of the sliding portion on the lip end portion 9 is prevented to enhance durability thereby.

Further, while the peak $P_0'$ is on the high-pressure side 30 to the center in axis direction of the contact area E, lubricant oil is not taken in, local abrasion (excavating abrasion) tends to be generated in the conventional product, the peak $P_0$ is near the center in axis direction of the contact area E on the low-pressure side 40, and extremely one-sided abrasion and local abrasion are prevented. In other words, the rotation shaft seal of the present invention with the construction described above can reduce the maximum contact pressure (peak pressure $P_0$), lubricant oil on the high-pressure side 30 is easily taken into (introduced to) the sliding portion on the rotation shaft, abrasion on the lip end portion 9 is remarkably reduced to realize long life (improve durability) of the seal. Therefore, in rotation shaft seals of compressors of air conditioners on motor vehicles, the present invention can sufficiently correspond to demand of recent high-pressurization of cooling media. Especially, sealability durable for a long period of time and long life can be shown in a compressor using $CO_2$ as the cooling medium.

As described above, the peak $P_0$ of the contact pressure P can be sufficiently reduced, local abrasion is prevented, excellent sealability is maintained for a long period of time, recent demand of high-pressurization of cooling media can be fulfilled, especially, the seal is appropriate for a compressor using $CO_2$ as the cooling medium because the rotation shaft seal of the present invention is a rotation shaft seal provided with the rubber lip portion 3 disposed between the housing 1 and the rotation shaft 2 to slide on the rotation shaft 2 and the supporting member 4 to receive the lip portion 3 from the back face 3a on the low-pressure side, in which the cross-sectional configuration of the lip portion 3 in free state is having the maximum thickness portion 7 in the area Z received by the supporting member 4 and provided with the diminishing lip end portion 9 gradually reducing the thickness from the maximum thickness portion 7 to the tip end 8 of the lip, when the back face inclination angle of the back face 9a of the lip end portion 9 to the axis L of the rotation shaft 2 is expressed as α and the inclination angle on pressure-receiving side of the inclining face 9b of the lip end portion 9 on the high-pressure side is expressed as β, relational expressions $15° \leq α \leq 30°$ and $1.7 \leq β/α 3.5$ are fulfilled, and, the distribution curve 20 of the contact pressure under pressure-receiving state in which the lip end portion 9 contacts the rotation shaft 2 is hill-shaped and the peak $P_0$ is on the low-pressure side 30 to the center M in the axis direction.

And, contact of the tip end 8 against the rotation shaft 2 with excessive contact pressure and abnormal local abrasion are prevented, the distribution curve 20 shown in FIG. 5 is obtained, and further long life of the seal is achieved because the tip end 8 of the lip is composed of the ring end face 18 with inclination as to enlarge in diameter toward the high-pressure side 30, and, when the end face inclination angle of the ring end face 8 to the axis L of the rotation shaft 2 is expressed as γ, the relational expression 60°≦γ≦90° is fulfilled.

Although the tip end 8 contacts the rotation shaft 2 with excessive contact pressure and break is generated when the width dimension $W_1$ is less than 0.5 mm, this problem is prevented and the desirable distribution curve 20 shown in FIG. 5 is obtained because the width dimension $W_1$ of the ring end face 18 is set to be 0.5 mm to 1.5 mm. When the width dimension $W_1$ is over 1.5 mm, the desirable distribution curve 20 shown in FIG. 5 is not obtained and partial abrasion tends to be generated.

The cross-sectional configuration of the lip end portion 9 is appropriate to obtain the desirable distribution curve 20 shown in FIG. 5 and contact pressure on the peak $P_0$ is sufficiently reduced because the inclination angle α of the back face and the inclination angle β of the pressure-receiving side fulfill the relational expression 2.0≦β/α≦2.5.

The maximum thickness portion 7 shows the highest function to obtain the gentle mountain-shaped or hill-shaped distribution curve 20 shown in FIG. 5, contact pressure on the peak $P_0$ is reduced, lubricant oil is sufficiently lead to the sliding portion on the rotation shaft 2, abrasion of the lip portion is remarkably reduced, and long life is achieved because the maximum thickness portion 7 of the lip portion 3 exists on the position of the corner portion 11 where the inclining face 9a on the high-pressure side, of which cross section in free state is straight, and the straight portion 10 of cylindrical external configuration parallel to the axis L are crossing, and the position of the corner portion 11 is disposed on the high-pressure side 30 to the tip end 14 on the high-pressure side of the supporting member 4.

And, although not shown in Figures, the straight inclining face 9b on the high-pressure side (shown in FIGS. 1 through 3) may be formed into a slightly-concave configuration having a concave curve, or a slightly-convex configuration having a convex curve to show similar functions and effects. And, the straight portion 10 "parallel" to the axis L (shown in FIGS. 1 through 3) includes a case that the straight portion 10 slightly inclines against the axis L with the small angle within ±5°. Similar functions and effects are shown also in case of the inclination with the small angle within ±5°.

The distribution curve 20 of the contact pressure P near the tip end 14 on high-pressure side is formed to draw a gentle curve because the gap dimension Go between the tip end 14 on the high-pressure side of the supporting member 4 and the peripheral face of the rotation shaft 2 is set to be 0.1 mm to 0.15 mm.

And, the lip end portion 9 is made contact the peripheral face of the rotation shaft 2 as shown in FIG. 4A, the distribution curve 20 of (desirable) contact pressure as shown in FIG. 5 is drawn, further stable and excellent sealability is shown, abrasion is prevented, and a rotation shaft seal having further improved durability is obtained because the relational expression 3≦$W_1$/Go≦15 is fulfilled when the width dimension of the ring end face is expressed as $W_1$ and the gap dimension between the tip end 14 on the high-pressure side of the supporting member 4 and the peripheral face of the rotation shaft 2 is expressed as Go.

While preferred embodiments of the present invention have been described in this specification, it is to be understood that the invention is illustrative and not restrictive, because various changes are possible within the spirit and indispensable features.

What is claimed is:

1. A rotation shaft seal provided with a rubber lip portion disposed between a housing and a rotation shaft to slide on the rotation shaft and a supporting member to receive the lip portion from a back face on a low-pressure side comprising a construction in which a cross-sectional configuration of the lip portion in free state is having a maximum thickness portion in an area received by the supporting member and provided with a diminishing lip end portion gradually reducing the thickness from the maximum thickness portion to a tip end of the lip, when a back face inclination angle of a back face of the lip end portion to an axis of the rotation shaft is expressed as α and an inclination angle on pressure-receiving side of an inclining face of the lip end portion on the high-pressure side is expressed as β, relational express ons 15°≦α≦30° and 1.7≦β/α≦3.5 are fulfilled, and a distribution curve of contact pressure under pressure-receiving state in which the lip end portion contacts the rotation shaft is hill-shaped and a peak is on the low-pressure side to a center in axis direction, wherein the tip end of the lip is composed of a ring end face, ring-shaped when observed in the axis direction of the rotation shaft and inclined at an angle so that the tip end increases in diameter parallel to the axis of the rotation shaft toward the high-pressure side, and, when an end face inclination angle of the ring end face to the axis of the rotation shaft is expressed as γ, a relational expression 60°≦γ≦90° is fulfilled;

a width dimension of the ring end face is set to be 0.5 mm to 1.5 mm; and the maximum thickness portion of the lip portion exists on a position of a corner portion where the inclining face on the high-pressure side, of which cross section in free state is straight, and a straight portion of cylindrical external configuration parallel to the axis are crossing, and the position of the corner portion is disposed on the high-pressure side to a tip end on the high-pressure side of the supporting member.

2. The rotation shaft seal as set forth in claim 1, wherein the inclination angle α of the back face and the inclination angle β of the pressure-receiving side fulfill a relational expression 2.0≦β/α≦2.5.

3. The rotation shaft seal as set forth in claim 1, wherein a gap dimension between a tip end on the high-pressure side of the supporting member and the peripheral face of the rotation shaft is set to be 0.1 mm to 0.15 mm.

4. The rotation shaft seal as set forth in claim 1, wherein a width dimension of the ring end face is expressed as $W_1$ and a gap dimension between a tip end on the high-pressure side of the supporting member and the peripheral face of the rotation shaft is expressed as Go, and a relational expression 3≦$W_1$/Go≦15 is fulfilled.

* * * * *